United States Patent [19]

Faivre et al.

[11] Patent Number: 5,610,764
[45] Date of Patent: Mar. 11, 1997

[54] DEVICE FOR IMPROVING THE FIELD OF VISION OF AIRCRAFT THAT DO NOT HAVE A SUFFICIENT TRANSPARENT SURFACE AREA

[75] Inventors: Francois Faivre, St Medard; Roger Parus, St Remy Les Chevreuse, both of France

[73] Assignee: Sextant Avionique, Meudon La Foret, France

[21] Appl. No.: 444,876

[22] Filed: May 19, 1995

[30] Foreign Application Priority Data

May 27, 1994 [FR] France ................................ 94 06462

[51] Int. Cl.⁶ .............................. G02B 27/14; G09G 5/00
[52] U.S. Cl. .............................. 359/630; 359/633; 345/7
[58] Field of Search .................................. 359/630, 631, 359/641, 632, 633; 345/7, 9

[56] References Cited

U.S. PATENT DOCUMENTS

| | | | |
|---|---|---|---|
| 4,264,134 | 4/1981 | Ellis | 359/630 |
| 4,419,079 | 12/1983 | Georges | 434/43 |
| 4,714,320 | 12/1987 | Banbury | 359/630 |
| 5,414,631 | 5/1995 | Denoize | 364/461 |

FOREIGN PATENT DOCUMENTS

| | | |
|---|---|---|
| 2265616 | 10/1975 | France . |
| 2263479 | 8/1973 | Germany . |
| 2916704 | 10/1980 | Germany . |
| 4210823 | 10/1993 | Germany . |
| 2006145 | 5/1979 | United Kingdom . |
| 2129154 | 5/1984 | United Kingdom . |

*Primary Examiner*—Georgia Y. Epps
*Assistant Examiner*—Ricky Mack
*Attorney, Agent, or Firm*—Oblon, Spivak, McClelland, Maier & Neustadt, P.C.

[57] ABSTRACT

A device to improve the field of vision in aircraft that lack sufficient transparent surface area. The device includes at least one collimator connected to an imaging sensor of the space outside the aircraft. The collimator projects an image in the pilot's field of vision. The image covers both the transparent window surface and the instrument panel of the cockpit. The image coincides with the real image in the field of direct vision produced by the transparent surface. A further image may also be viewed by the pilot through a periscope arrangement.

18 Claims, 3 Drawing Sheets

DEVICE FOR IMPROVING THE FIELD OF VISION OF AIRCRAFT THAT DO NOT HAVE A SUFFICIENT TRANSPARENT SURFACE AREA

BACKGROUND OF THE INVENTION

The present invention relates to a device for improving the field of vision of aircraft that do not have a sufficient transparent surface area. It can be applied notably to aircraft whose transparent surface area available in the front does not enable the pilot to have sufficient vision to make a landing.

A new generation of supersonic civilian aircraft is being prepared. These aircraft and those of a previous generation, notably the Concorde, have the common characteristic of a high angle of incidence when approaching the ground. This makes it difficult to obtain downward viewing through the transparent surfaces. The option of the tilting nose, used for Concorde, is now discarded for economic reasons. Furthermore, the shape of these aircraft is dictated by economic constraints. These constraints give rise notably to the fact that the available transparent surface areas do not make it possible to cover the requisite field of vision in the landing stage.

These aircraft could therefore ultimately have either no transparent surface or only a transparent surface that gives only an upward field of vision.

Solutions to improve the field of vision are used in conventional aircraft, essentially for night flight or in poor conditions of visibility.

One known approach reconstitutes, for example, an artificial image of the outside world on a display by means of energy sensors and/or synthesis from a data base.

An image is sometimes presented in a head-up collimator. The collimated image, which conforms to the outside world, is superimposed optically on this outside world, covering a part of the transparent surfaces of the cockpit.

These known approaches are not suited to future supersonic aircraft for they enable the improvement of vision in the existing field of vision, notably that given by the transparent surfaces. They cannot be used to improve the field of vision in preserving the conformity of the display to real conditions when the transparent surface becomes insufficient.

SUMMARY OF THE INVENTION

The aim of the invention is to overcome this drawback.

To this end, an object of the invention is a device for the improvement of the field of vision of an aircraft pilot, wherein said device is constituted by at least one collimator connected to an imaging sensor of the external space, the collimator projecting an image in the pilot's field of vision, this image overlapping the transparent part of the cockpit of the aircraft enabling direct vision and the non-transparent part of the cockpit, the collimated image coinciding with the real image in the field of direct vision.

The main advantages of the invention are that it can be adapted to every type of aircraft, enables the improving of the pilots' viewing and is simple to implement and economical.

BRIEF DESCRIPTION OF THE DRAWINGS

Other features and advantages of the invention shall appear from the following description, made with reference to the appended drawings, of which.

MORE DETAILED DESCRIPTION

Figure 1:
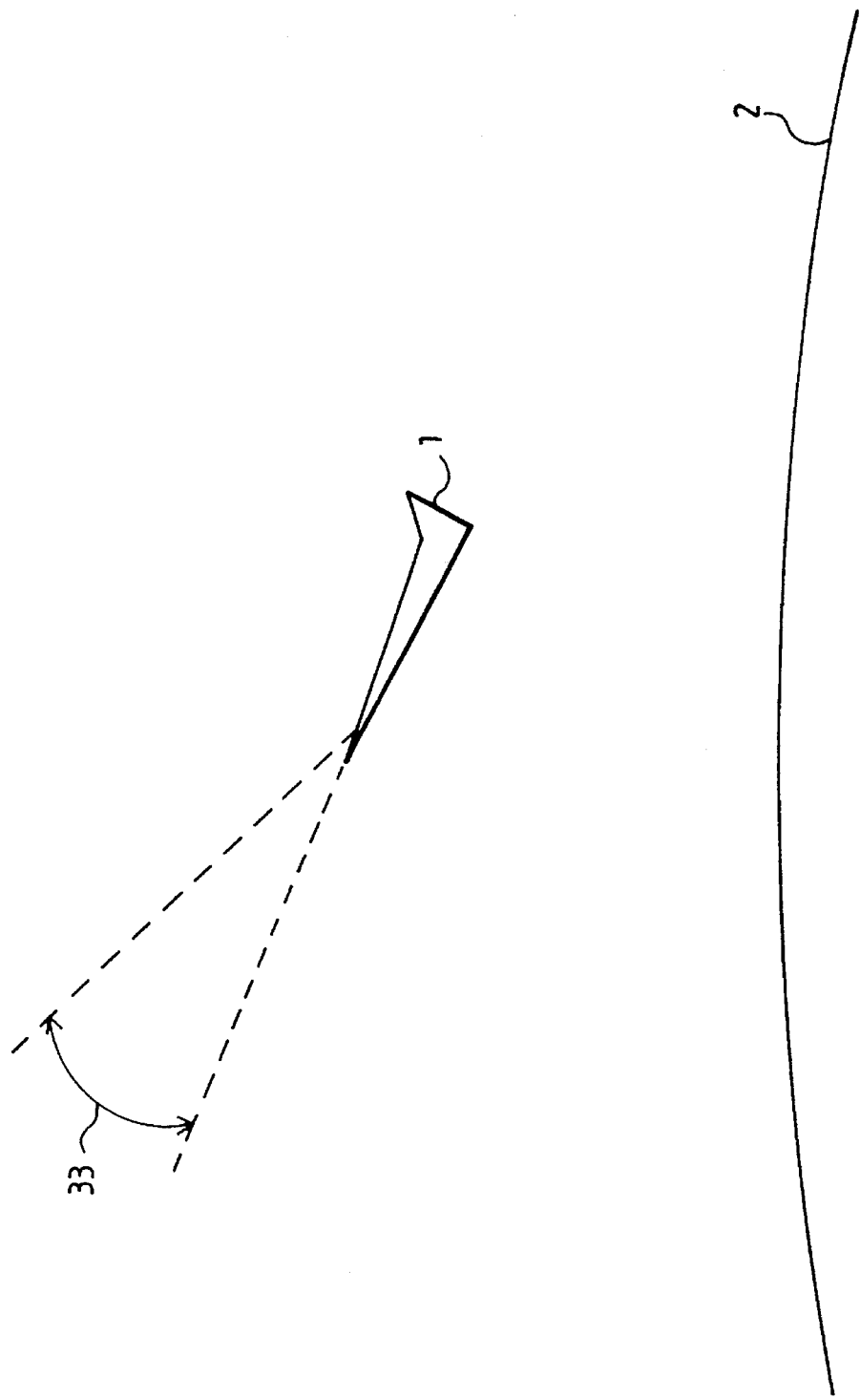
FIG. 1 shows an aircraft in a ground approach stage.

FIG. 1 illustrates an aircraft 1 in a landing stage where it is approaching a track 2. The aircraft has a relatively high angle of incidence. The pilot's field of vision 33 is necessarily oriented upwards and does not allow him, for example, to make a landing by sight. If, furthermore, the transparent surface area is limited, notably by aerodynamic constraints, then the difficulty is further increased.

Figure 2:
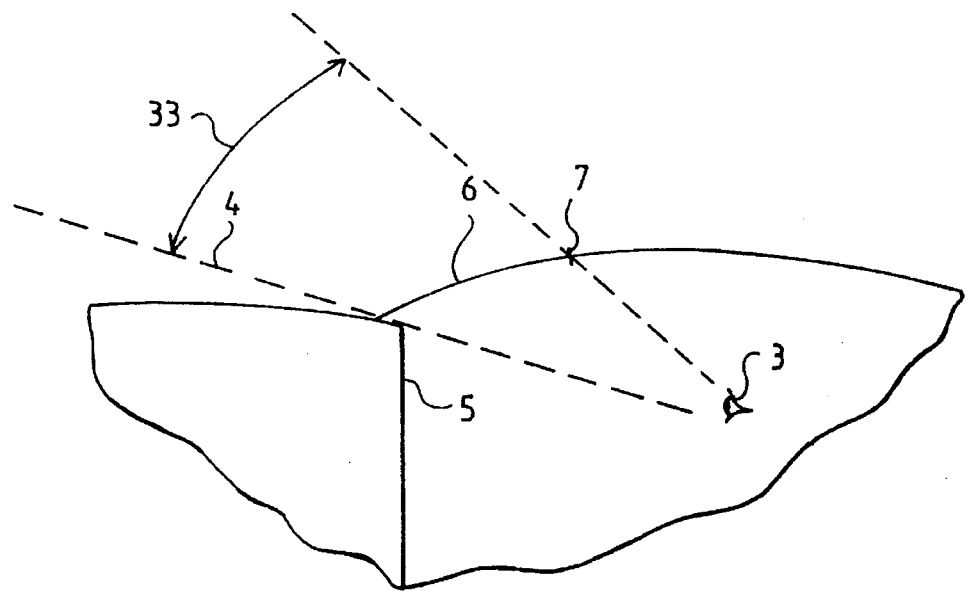
FIG. 2 illustrates the field of vision of the aircraft pilot.

FIG. 2 illustrates the pilot's field of vision. The field of vision 33, starting from the pilot's eye 3, is limited in its lower part by a line 4 passing through the top of the instrument panel 5. The field of vision therefore starts from this field and extends upwards through the available transparent surface 6 of the cockpit. The field is limited in the upper part by the top 7 of the transparent surface.

Figure 3:
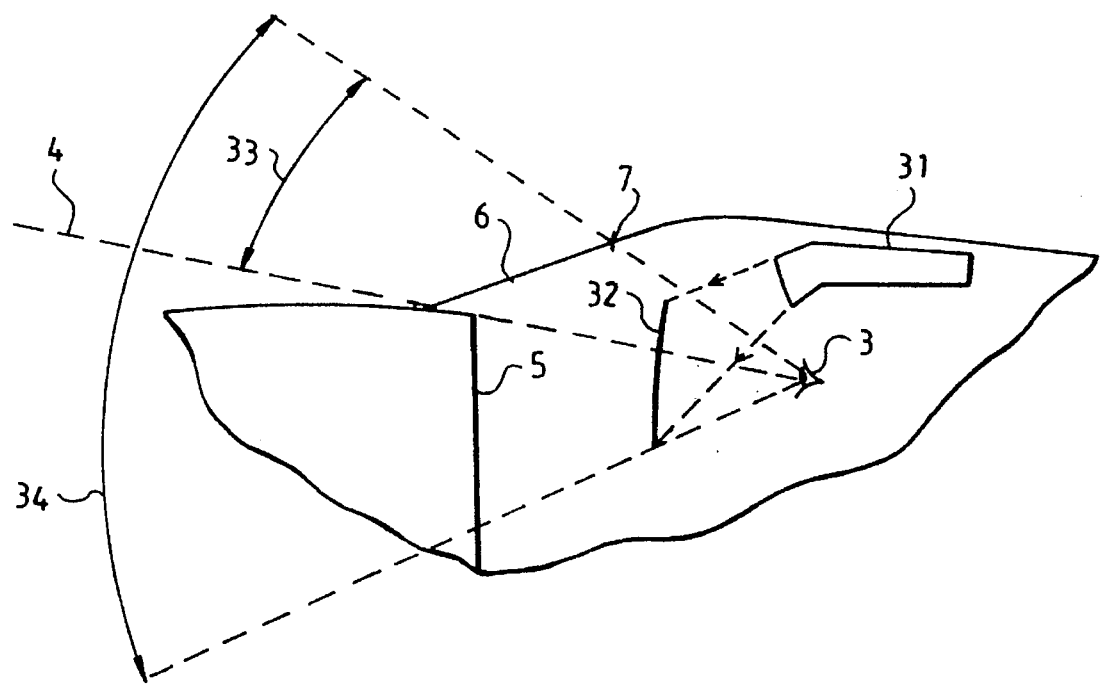
FIG. 3 shows a first possible exemplary embodiment of a device according to the invention.

FIG. 3 shows a first possible embodiment of a device according to the invention. This device comprises at least one head-up collimator 31, 32 connected for example to an imaging sensor (not shown). Since the projector 31 of the collimator is located in the top part, above the pilot, it projects a collimated image on a semi-reflective, transparent screen 32. The projected image is such for example that it is superimposed partly or totally, in its upper part, on the real vision 33 permitted by the transparent surface while its lower part is superimposed on the instrument panel 5. The image projected in this lower part corresponds to a field of vision that extends downwards beyond the lower line 4 of the real field of vision. This has the effect of giving a greater total field of vision 34, increasing the range of downward vision.

The reconstitution of a vision similar to natural vision in a wide angular field encompassing the real zone of vision places the pilot in a position where he can have improved perception, understanding and instructive sense of the position of his aircraft. Furthermore, since the sequence of generation and display of the artificial image could be subjected to malfunctions, the fact that this artificial image is related, by total or partial superimposition in certain parts of its field, with the image obtained by direct vision which is assumed to be unaffected by malfunctions provides security to this artificial image while at the same time increasing the confidence of the crew.

The lower parts of the cockpit, notably the instrument panel, on which the artificial image is superimposed, are preferably carefully finished so that they do not hamper the vision of this image. This is done, for example, by choosing neutral colors and anti-reflection elements. During the use of the collimated artificial image, the panel instruments located in its field are for example turned off, their vital or necessary information elements being then included in the collimated image. These information elements are displayed for example in such a way that they coincide with their real position on the instrument panel.

The artificial image has, for example, in its part covering the non-transparent zones of the cockpit, solely external space elements that are useful for the operations-planned, notably landing. The artificial image is extinguished in the flight stage for example, and activated only at the start of the landing stage. During this stage, the artificial image is not, for example, activated permanently, notably if the simultaneous exploitation of the real image and of the artificial image should prove to be difficult for the pilot. The artificial image may then be presented sequentially. It may be removed totally or partially. It may, for example, be removed in its part superimposed on the real direct vision and kept in its part superimposed on the non-transparent zone of the cockpit. In any case, the decision to keep the image or to make it disappear partially or totally is left to the pilot.

An imaging sensor is, for example, a television type camera which is connected to the head-up collimator. To enable landing in all weather, notably in poor meteorological conditions entailing poor visibility, other sensors may be used. The latter are, for example, infrared sensors or millimetrical radars. If necessary, the image given to the collimator may be a synthesized image obtained, for example, from an on-board data base according to the localization of the aircraft. Instead of being placed on board, the data elements of the synthesized image may for example be sent by a microwave link when an airport is approached, the data elements being, for example, sent from this airport.

Figure 4:
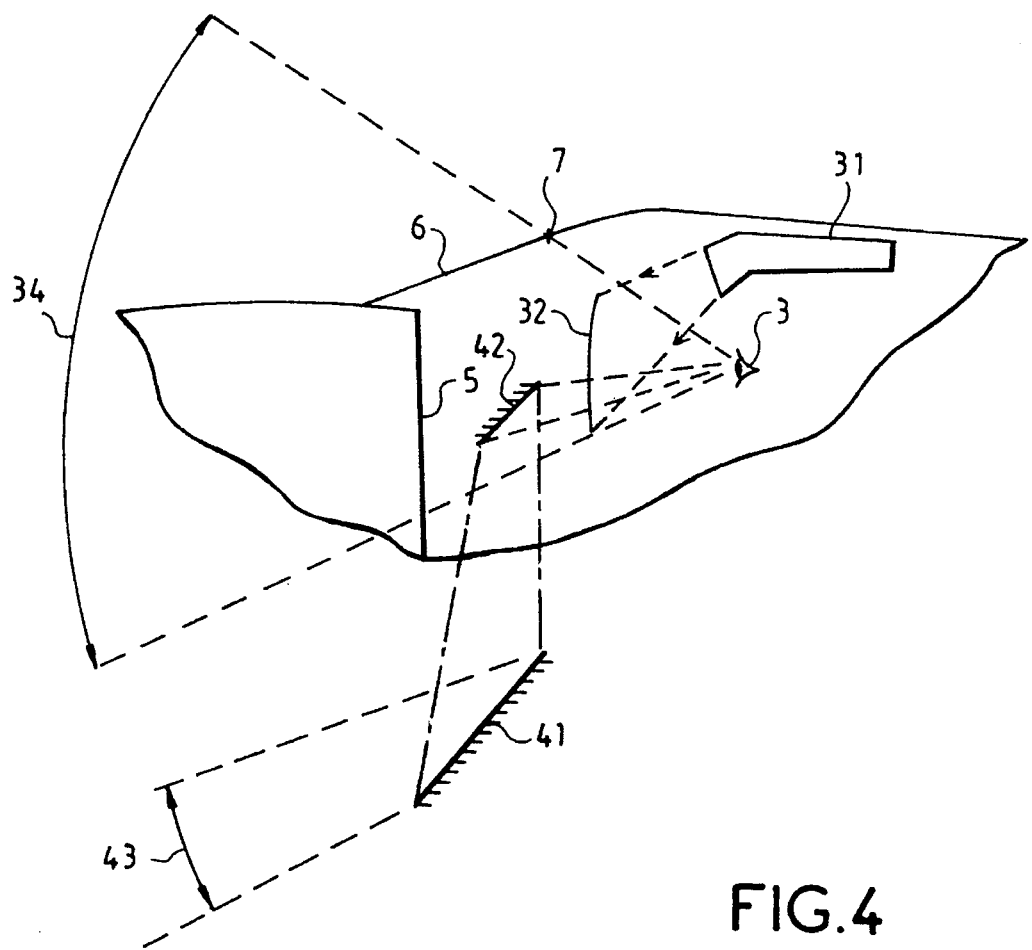
FIG. 4 shows a second possible exemplary embodiment of a device according to the invention.

FIG. 4 shows another possible embodiment of a device according to the invention. As compared with the exemplary embodiment shown in FIG. 3, it further comprises a passive optical device 41, 42 enabling vision located below the lower line 4 of the field of direct vision. This passive optical device is, for example, constituted by two mirrors 41, 42 facing each other as in a periscope, a first mirror 41 being oriented towards the external space below the above-mentioned line 4 and the second mirror 42 being oriented towards the pilot's eye 3 so as to return to it the image 43 picked up by the first mirror 41. This picked-up image 43 is superimposed on the artificial image projected by the collimator. The passive optical device 41, 42 must be such that it gives an accurate vision of the scene, with the lowest possible parallax so that its image coincides appropriately with the superimposed artificial image. The residual disparity may, if necessary, be compensated for by deliberate distortion of the artificial image. The image of the passive optical device appears in the internal zone of the cockpit where there is no direct external vision. Since the upper direct vision coincides with the upper part of the artificial image, the image picked up by this optical device secures the artificial image in its lower part, where direct vision is impossible.

Figure 5:
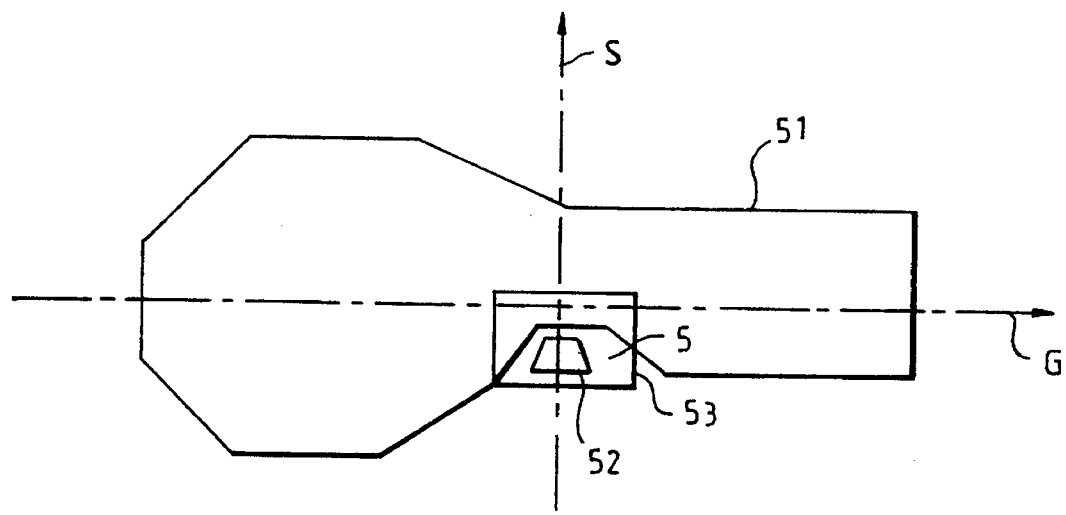
FIG. 5 shows a total field of vision produced by a device according to the invention.

FIG. 5 gives a view, with respect to the elevation angle axis S and bearing axis G, of different possible zones of vision that can be produced by a device of the type shown in FIG. 4. A first zone 51 corresponds to the field of direct vision, through the transparent surface of the aircraft cockpit. A second zone 52, included in the non-transparent part of the cockpit, corresponds to the field of vision produced by the passive optical device 41, 42. A zone 53 overlapping both a portion of the transparent part and a portion of the non-transparent part of the cockpit, the instrument panel 5 for example, corresponds to the field of vision produced by the collimator 31, 32. This zone 53 furthermore encompasses the field of vision 52 produced by the passive optical device.

The zone 53 of the collimator covers, for example, an operational field of vision enabling the pilot to make a landing in full safety with the assistance notably of the aircraft system.

It may be necessary to adapt the luminance of the image of the collimator to the background on which it is superimposed, namely the zones 5, 51 or 52. This may be obtained by action on the luminance of the projected image or on the index of transmission of the glass of the collimator in each zone concerned.

However, the zones presented in FIG. 5 are adapted to a given position of the pilot, notably a given position of his head. Although this position is supposed to be stable, it may nevertheless vary. To resolve this problem, it is then possible, in the image produced by the collimator, to plan for a peripheral transition zone that adapts to the pilot's head motions. This can be done by the bringing into play, for example in this zone, of the index of transmission of the glass 32 of the collimator as a function of the pilot's angle of vision and the bringing into play of the luminance of the projected image, according to the solution chosen to discriminate between the zones.

The exemplary embodiments of the device according to the invention presented here below improve the field of vision, notably by increasing it towards the bottom. However, any device according to the invention may increase the field of vision in all directions in conformity with the safety requirements of the operations concerned. Depending on the directions envisaged, the projector is not obligatorily in the top part but at a place enabling it to project the desired image.

What is claimed is:

1. A device for the improvement of an aircraft pilot's field of vision, comprising a collimator, the collimator projecting an image of the external space in the pilot's field of vision, wherein the collimated image is imposed on both the transparent part of the cockpit of the aircraft enabling direct vision and the non-transparent part of the cockpit, the collimated image coinciding with the real image in the field of direct vision.

2. A device according to claim 1, wherein the projector of the collimator is placed in a top position to project an image partly covering the instrument panel of the aircraft.

3. A device according to claim 1, wherein the image produced by the collimator is produced sequentially.

4. A device according to claim 3, wherein the part of the collimated image overlapping the non-transparent part is active permanently during a given operation.

5. A device according to claim 4, wherein the operation is the landing operation.

6. A device according to claim 1, furthermore comprising a passive optical device producing an image of the exterior coinciding with the collimated image and being in the non-transparent part of the cockpit.

7. A device according to claim 6, wherein the passive optical device is formed by two facing mirrors, a first mirror being oriented towards the external space and the second mirror being oriented towards the pilot's eye.

8. A device according to claim 6, wherein the passive optical device produces an image of the external space located in the front lower part of the aircraft.

9. A device according to claim 1 wherein, with the collimated image covering a part of the instrument panel and being activated, the indicators of the instrument panel are turned off and the information elements of the instrument panel that are necessary for the operation in progress are reproduced by the collimator.

10. A device according to claim 9, wherein the reproduced information elements coincide, in the collimated image, with their real position on the instrument panel.

11. A device according to claim 1, wherein the imaging sensor is a television camera.

12. A device according to claim 1, wherein the imaging sensor is an infrared sensor.

13. A device according to claim 1, wherein the imaging sensor is a millimetrical radar.

14. A device according to claim 1, wherein the glass of the collimator comprises a peripheral, transition zone enabling the collimated image to be adapted to the pilot's head motions.

15. A device according to claim 14, wherein the index of transmission of the peripheral zone is a function of the pilot's angle of vision.

16. A device according to claim 14 wherein, in the peripheral zone, the luminance of the projected image is a function of the pilot's angle of vision.

17. A device according to claim 1, wherein the image given to the collimator is a synthesized image.

18. A device according to claim 17, wherein the synthesized image is obtained from an on-board data base and as a function of the localization of the aircraft.

* * * * *